United States Patent [19]

Blake

[11] 3,998,574
[45] Dec. 21, 1976

[54] PROCESSED-PACED, FLUIDIC CONTROL SYSTEM FOR MOLDING MACHINES

[76] Inventor: Frederick H. Blake, 226 W. Edith Ave., No. 28, Los Altos, Calif. 94022

[22] Filed: Oct. 3, 1975

[21] Appl. No.: 619,442

Related U.S. Application Data

[63] Continuation of Ser. No. 438,580, Feb. 1, 1975, abandoned.

[52] U.S. Cl. .............................. 425/137; 137/804; 425/152
[51] Int. Cl.² ........................................ B29F 1/14
[58] Field of Search .......... 425/135, 136, 137, 165, 425/139, 167, 152, 150; 137/803, 804, 805

[56] References Cited

UNITED STATES PATENTS

| 2,317,839 | 4/1943 | Westin | 425/137 |
|---|---|---|---|
| 2,959,900 | 11/1960 | Wollett | 425/161 X |
| 3,507,212 | 4/1970 | Matteson | 137/804 X |
| 3,677,680 | 7/1972 | Etherington | 425/138 X |
| 3,859,015 | 1/1975 | O'Brien, Jr. | 425/150 X |

OTHER PUBLICATIONS

"Applications for Fluidics", Staff Report, *Hydraulics J Pneumatics,* June, 1969.
Higgins, Paul T., *Fluidics Control High Speed Machinery,* Bendix Electrical Components Div., Feb., 1968.

*Primary Examiner*—Francis S. Husar
*Assistant Examiner*—David S. Safran
*Attorney, Agent, or Firm*—Brown & Martin

[57] ABSTRACT

A system for controlling a molding machine utilized to mold food products on a stick. The system incorporates fluidic logic elements that are responsive to signals generated by the piston position in actuation cylinders so that the system control is dependent on the process condition, rather than on timing or other indirect process control methods. The fluidic logic elements command the actuating cylinders through air piloted valves, in a wholly pneumatic system. The control system is continuously recycled with minimal delay between cycles unless a failure of the system to produce a complete and dispensed produce is sensed. The dispensing of the product is positively determined by a fluidic sensor and a logic control circuit that determines that the product has dropped into and through a sensing airstream. If a malfunction is detected the machine shuts down and will not restart unless the start-stop control is cycled, so that the machine may be safely serviced. During normal machine operation, the machine will complete a cycle when "stop" is selected so that jamming (caused by a partially completed product) will not occur when it is restarted.

5 Claims, 8 Drawing Figures

PROCESSED-PACED, FLUIDIC CONTROL SYSTEM FOR MOLDING MACHINES

This is a continuation of application Ser. No. 438,580, filed Feb. 1, 1975, now abandoned.

BACKGROUND OF THE INVENTION

High production molding machines are an important factor in many industries. The food processing industry is an example. Molding machines are finding increasing utilization in making a wide variety of food products. These molding machines are potentially capable of producing a great increase in product production, over what can be accomplished by manual means, but have had a limited use and utility due to a number of unsolved deficiencies.

Prior art food injection molding machines have been extremely expensive at first purchase, and have had a high maintenance requirement. One source of maintenance problems is the use in some machines of electronic control. The usual electronic maintenance costs are accentuated by the environment in which the food processing machines are utilized. This environment is normally a humid one with high exposure to foreign matter. Further, food processing plants are subject to power surges and other variations in electrical power, that may damage electronic control systems, or cause them to malfunction.

A furher limitation of prior art food molding machines has been, that their production rate is limited by the manner in which the various processing steps are controlled. A timing type of control that allows an adequate time for the previous actuation function to be completed, before initiating the successive actuating function, is undesirable. Such a control inherently must provide for the maximum time that a cycle may take, in order to avoid premature actuation of the successive steps. Additionally, the timing control systems are undesirable because they require excessive set up time and adjustment and because they are susceptible to jamming or other malfunctions when a processing step exceeds the normal maximum time allotment.

Prior art injection molding machines used in processing food on a stick have been unable to insert the stick into the molded product after the food has been completely injected into the mold. This is due to the type of time-sequenced control used in these previous machines. There is a definite improvement in the product, especially in its appearance when the stick is inserted after the food or meat product is injected into the mold cavity (not during its injection), and when mold is completely full. This is because there is no tendency for the stick to be cocked off to one side of the mold by the turbulent inrushing food or meat as it is being forced at high velocities into the mold by the injector piston. This has been the case of previously designed, time-sequenced machines covered by other patents where the stick is driven from one end of the mold at approximately the same time as food or meat is being injected into the other end of the mold. Experimentation shows and has proved that there is a major advantage to driving the stick into the filled mold when the mold "filling" or food product is in a quiescent condition.

Thus it is desirable to have a control system for molding machines that reduces the cycle time, and therefore increases the production rate, especially if such a system is of relatively low initial cost, has a high operational reliability, a low maintenance requirement, and puts the stick in after the mold is full. Such a control system is additionally desirable if it is sensitive to actual malfunctions, to avoid compounding a single malfunction by recycling the machine, when a product has not been perfectly produced and dispensed.

SUMMARY OF THE INVENTION

An exemplary embodiment of the invention is described in its utilization on a molding machine for producing a molded ground meat or other food product, secured in most cases over a stock handle. Such a molding machine comprises generally a pneumatic cylinder actuated molding machine, that operates from a pressurized meat or pumped product source. The meat is injected into the mold cavity from a trapped-cavity metering device. The injection power is provided by an adjustable stroke injector piston so that the precise volume of the meat injected is under control. A separate cylinder injects a stick handle into the mold cavity, to form a handle for the finished product.

After molding, the product is dispensed by cylinders retracting the mold halves to allow the product and handle to drop free of the mold. This product dispensing action is facilitated by an air blow, that provides an air bias to supplement the gravity dispensing action.

The invention incorporates a plurality of process sensor means comprising fluidic stroke signal sensors, that are activated by the piston position in the various actuating cylinders. The fluidic signals from these sensors are utilized by the process step control means comprising a plurality of fluidic logic elements that sequence the various process steps by controlling a plurality of air piloted valves and thereby determining when the pneumatic power is delivered to the various actuating cylinders.

Malfunction means are incorporated in connection with the process step control means. The malfunction means comprises fluidic article sensing means that detects the passage of the product during the dispensing of the product from the molds. In this manner, the malfunction means provides a positive indication that the product has been dispensed in the normal manner, and allows the recycle means to commence a successive cycle of the process step control means.

A start-stop means is configured to stop the operation of the machine, only after the completion of a cycle. Restart of the machine after a malfunction or intentional selected stop, may be accomplished only by turning the control to the stop reset position and then returning it to the start position.

A unique sensor is incorporated in connection with the variable stroke injector piston and detects the decay of pressure in the unused supply line (on exhaust stroke) to provide an indication and signal of the stroke completion.

It is therefore an object of the invention to provide a new and improved processed-paced fluidic control system for molding machines. Such a system incorporates a sequential or event based logic control instead of the previously used time based logic control.

It is another object of the invention to provide a new and improved control system for molding machines that is reliable in operation.

It is another object of the invention to provide a new and improved control system for molding machines that is paced by the position of the various actuating cylinders.

It is another object of the invention to provide a new and improved control system for molding machines that produces molded products at an increased rate.

It is another object of the invention to provide a new and improved control system for molding machines that utilizes pneumatic power for all control and actuating functions.

It is another object of the invention to provide a new and improved control system for molding machines that provides a positive indication of proper operation by detecting the dispensing of a completed product.

It is another object of the invention to provide a new and improved control system for molding machines that has improved safety of operation.

It is another object of the invention to provide a new and improved control system for molding machines that allows a cycle to stop only at a predetermined process phase.

It is another object of the invention to provide a new and improved control system such that the stick is driven into the filled mold and not when mold is in process of being filled, thus assuring correct centering of stick in the product.

Other objects and many attendant advantages of the invention will become more apparent upon a reading of the following detailed description together with the drawings, in which like reference numerals refer to like parts throughout and in which.

Figure 1:
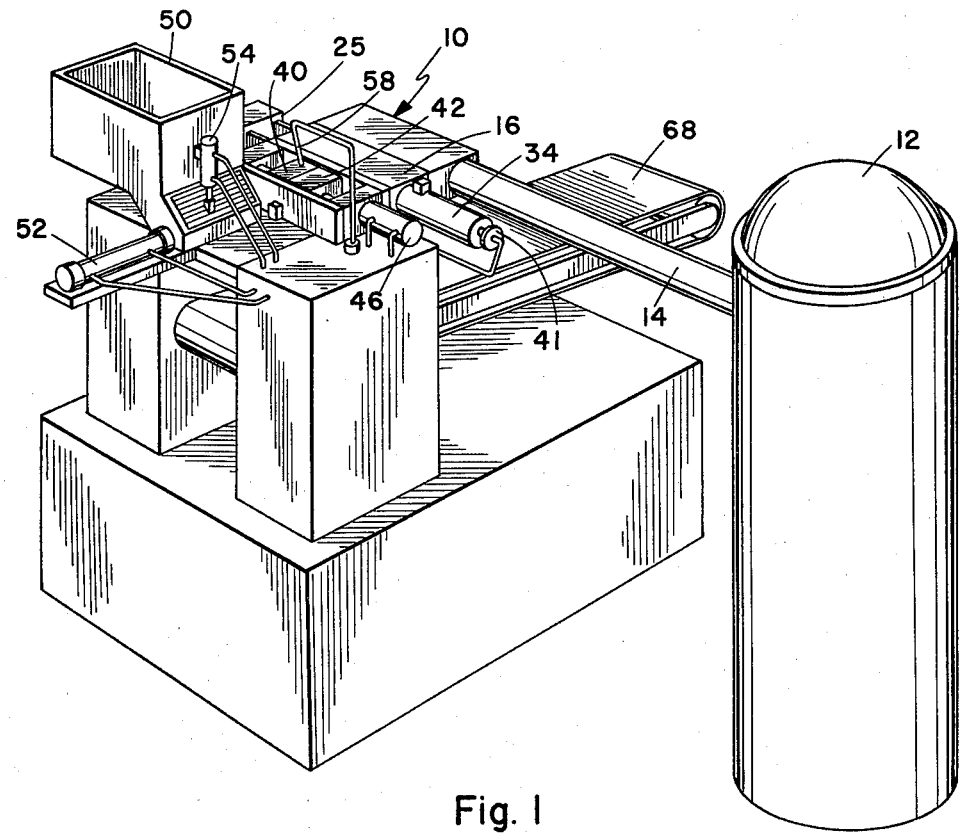
FIG. 1 is a perspective view of the complete molding machine.
Figure 3:
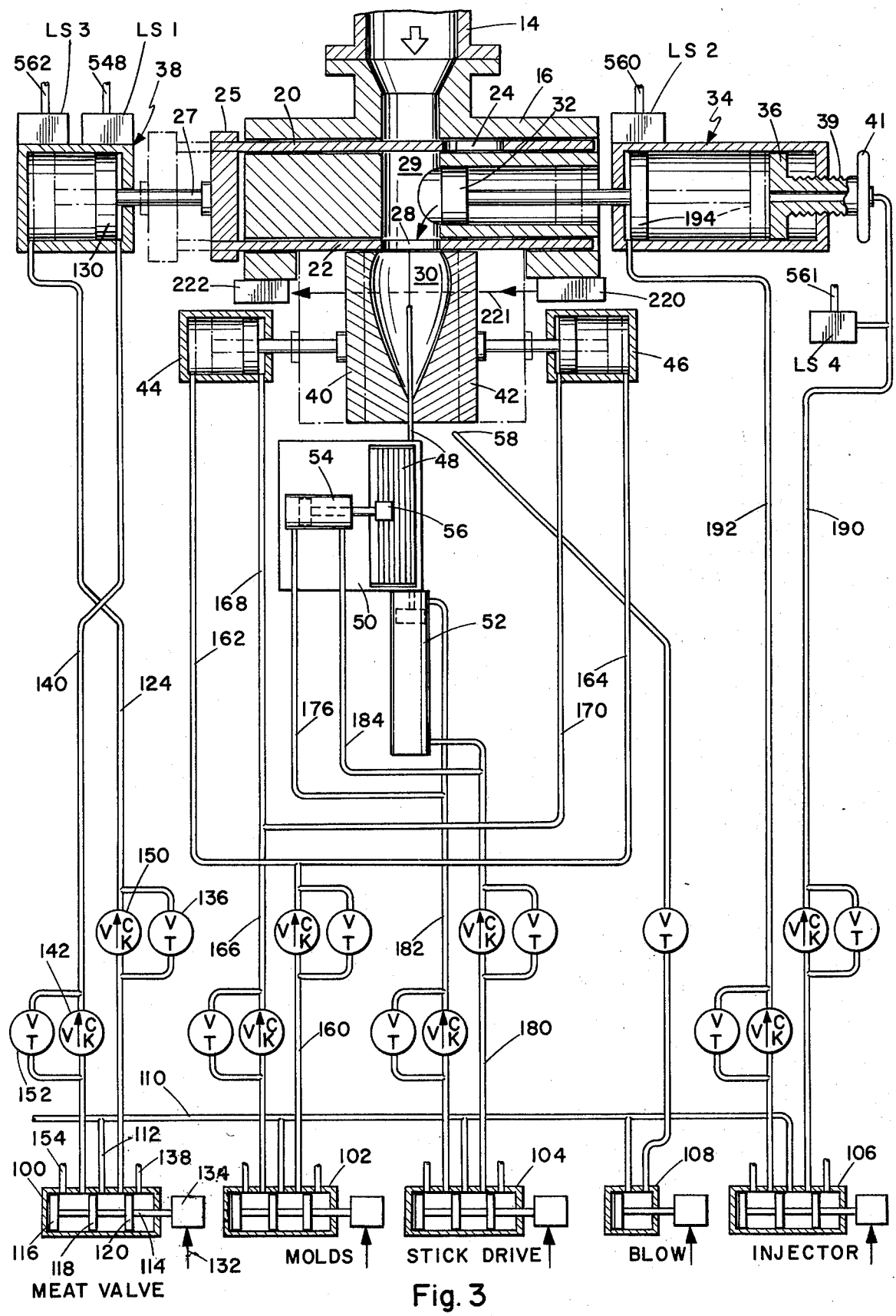
FIG. 3 is a diagram of the machine actuating system with portions shown in section.

Referring now to the drawings, there is illustrated in FIGS. 1 and 3, a meat molding machine 10, incorporating the control system of the invention. The meat molding machine includes a source of pressurized meat 12, delivered via conduit 14, to the meat valve injection housing 16. Entry of meat from passage 14 to the housing 16 is controlled by a meat valve actuating cylinder 38. The meat valve has a plurality of valve slides 20 and 22. Valve slides 20 and 22 are connected via tie block 25, and piston shaft 27, to meat valve cylinder 38. Valve slide 20 has an opening 24 that may be reciprocated into registration with the terminable portion of conduit 14, to allow the meat product to enter the metered injection cavity 29. Valve slide 22 has an opening 28 that may be reciprocated into position to permit the meat product in the injection cavity 29, to be forced into the mold cavity 30.

The entry of the meat product into the mold cavity is controlled by an injector piston 32. Piston 32 has a variable stroke, determined by an adjustable head end 36, of the cylinder 34. The details of the design of cylinder 34 will become more apparent from the detailed description hereinafter.

The mold cavity 30 is formed between mold halves 40 and 42 which are positioned together, or withdrawn by corresponding mold actuating cylinders 44 and 46.

The stick or handle 48, inserted into the mold meat product, is dispensed from a bin 50 and injected by a stick driving cylinder 52. The positioning of the stick for dispensing is controlled by a hold down cylinder 54, having a contactor shoe 56.

After the meat product has been molded, and the mold halves 40 and 42 retracted, it is dispensed by the gravity action together with air pressure from product blow tube 58. The completed product is carried away by a conveyor 68.

FIG. 3 also illustrates a plurality of air piloted four way valves 100, 102, 104 and 106. A one way air piloted valve 108 is also illustrated. The detailed construction of meat valve, air piloted valve 100, is typical of all of the four way valves utilized.

A supply air manifold 110, delivers operating pressure air through stub 112, to the air piloted valve 100. A valve stem 114, within the valve, includes three sealing pistons 116, 118 and 120. The position of these pistons within the meat-valve air piloted valve 100 controls the air flow from the air supply manifold 110 and stub 112. The position illustrated (with air pilot 134 energized), piston 118 permits air from stub 112 to pass into line 124 to be delivered through check valve 150 to the end of meat valve cylinder 38. This pressure drives the meat valve cylinder piston 130, between the dotted line and solid line positions illustrated, to cause slide 22 to bring opening 28 into registration with the opening in the molds. Removal of the fluidic signal on the diagrammatically illustrated line 132, causes valve actuator 134 to stroke the pistons to the opposite end of the cylinder moving pistons 116, 118 and 120 into opposite position of that shown. Then excess pressure retained between valves 118 and 120, or forced through the throttling valve 136 is vented by vent stub 138. With the valve stroke, the air supply stub 112 delivers air to the interpiston space between pistons 118 and 116 and thereby causes the air to be delivered through line 140, and check valve 142, to the return side of meat valve cylinder 38, causing the piston 130 to return to the dotted line position. Check valves 142 and 150 perform identical functions for lines 124 and 140 in allowing unrestricted flow of the stroking air to the cylinder, but preventing return air from passing through the check valve. The return air is channeled through throttling valves 136 and 152, so that exhaust air is delivered through the exhaust stubs 138 and 154 in a flow controlled fashion at the appropriate portions of the cycle. The use of the throttling valve on the returned side prevents slamming of the piston. Throttling valves 136 and 152 and check valves 142 and 150 perform identical functions for the molds and stick drive and injector functions.

The mold close line 160 has two branches 162 and 164 to provide closing pressure to both mold cylinders 44 and 46. Similary mold open lines 166 has branches 168 and 170 to provide mold open pressure to both mold cylinders 44 and 46. Stick drive line 180 provides stick driving pressure to stick drive cylinder 52 while at the same time removing hold down force on the sticks through providing pressure to the retraction side of hold down cylinder 54 throuh line 184. Stick drive retraction line 182 delivers retraction pressure to the stick drive cylinder 52 and applies hold down force by cylinder 54 through line 176.

Line 190 provides injector piston drive pressure to injector cylinder 34 through adjustable head end 36. Injector retraction line 192 causes the injector piston to retract by the application of return pressure to the injector cylinder 34 causing the piston 194 thereof to return to the dotted line position illustrated.

FIG. 3 illustrates the positioning of the various sensors used in the process step control means of the invention. The piston stroke sensor LS 3 is positioned on the retraction side of meat valve cylinder 38, to sense piston 130 reaching that end of the cylinder. Similarly, piston stroke sensor LS 1 senses the piston 130 reaching the filling or open-to-mold portion of the stroke. Piston stroke sensor LS 2 is utilized on the injector cylinder 34 to sense the injector 32 having completed its stroke. The return of the injector piston to the solid line position illustrated, cannot be sensed by a normal stroke sensor such as sensor LS 2 and therefore sensor LS 4 is provided in the air supply line 190. The operation of the cylinder stroke sensors LS 1, 2 and 3, as well as configuration utilized for cylinder stroke sensor LS 4 will be described more fully hereinafter. FIG. 3 also illustrates the positioning of the sensor utilized in the malfunction means, to detect the dispensing of a product. The secondary sensing stream 221 is directed from emitter 220 to ward the receiver 222, creating an air stream directly across the mold halves 40 and 42, so that when a product drops from the molds, it must pass through and interrupt the air stream.

Figure 2:
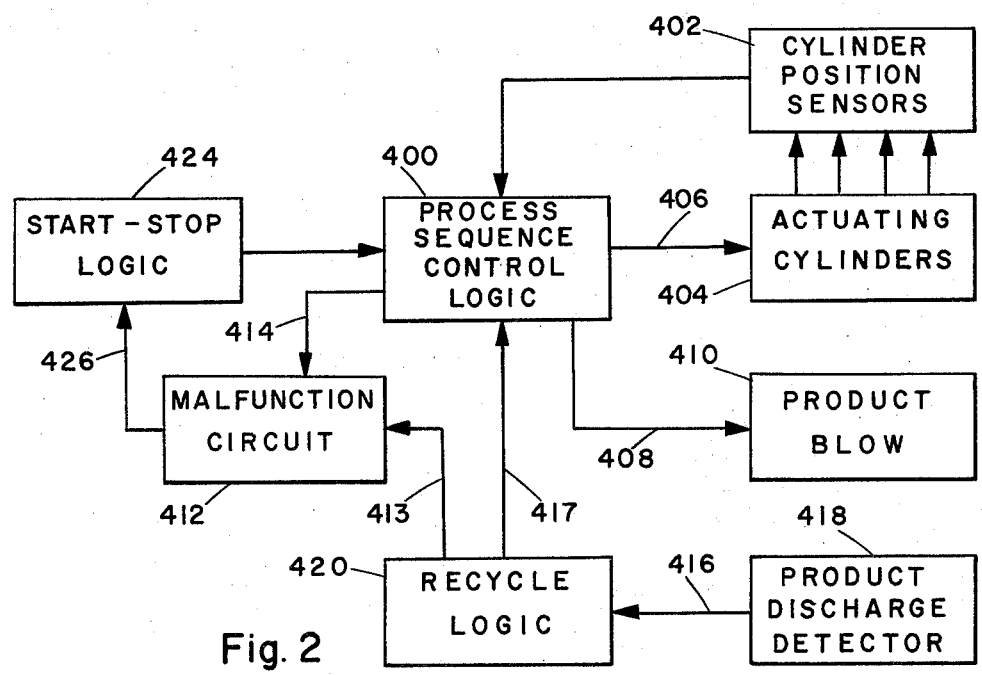
FIG. 2 is a block diagram of the basic control system.

Referring now to FIG. 2, there is illustrated the generalized system block diagram of the process control means of the invention. Signals concerning the state of the molding process are provided to the process sequence control logic 400, by the cylinder position sensors 402. The cylinder position sensors are mounted on, or in association with, the actuating cylinders 404. The process sequence control logic 400 calls for actuating steps through line 406, to the actuating cylinders, and line 408 to the product blow system 410. The malfunction circuit 412 is actuated by a signal on line 414 from the process control logic 400, which signal corresponds to the completion of the molding cycle, on line 416 from the product discharge detector 418. The product discharge detector produces a signal on line 416 when a completed molded product drops into and through the sensing stream. The sensing of a dispensed product results in the recycle logic 420 subverting the action of the malfunction circuit by a signal on line 413, and the initiation of another cycle by a signal on line 417. Alternatively if no product is dispensed within a preset time, the malfunction circuit causes the start-stop logic to stop the machine operation, by a signal on line 426. The start-stop logic 424 may be recycled to cause initiation of a new series of process cycles, after it has been manually shut off or after a malfunction has stopped the machine.

Figure 6:
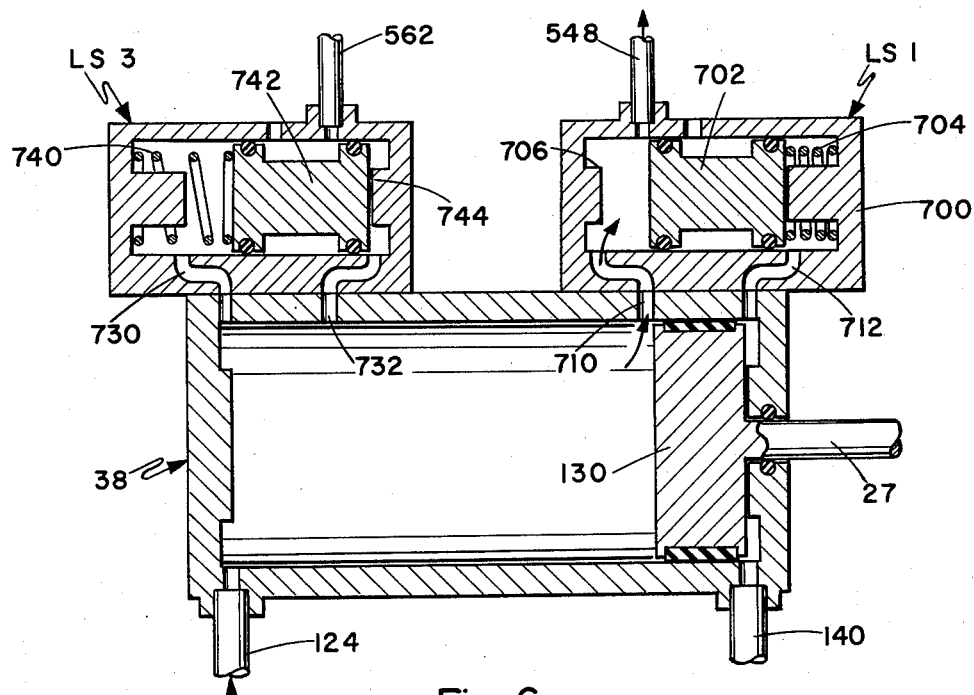
FIG. 6 is an enlarged sectional view of the meat valve cylinder and stroke sensors.
Figure 7:
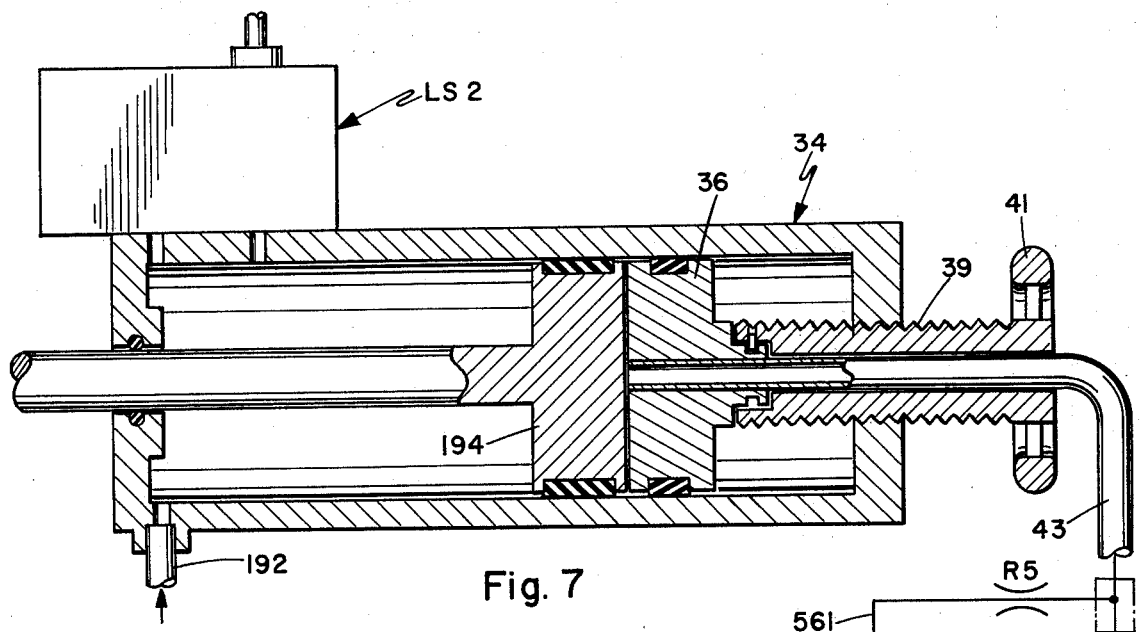
FIG. 7 is an enlarged sectional view of the meat injector cylinder.
Figure 8:
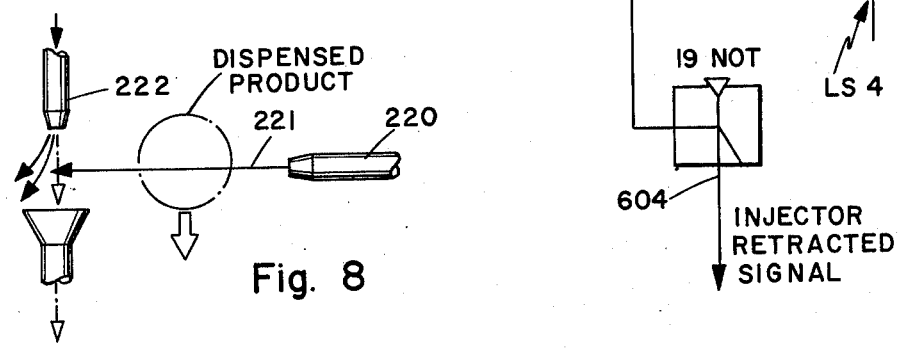
FIG. 8 is a diagram illustrating the action of the dispensed product detector means.

Referring now to FIGS. 6 and 7, the two types of stroke sensors are illustrated. In FIG. 6, a typical stroke sensor LS 1 has a body portion 700 and a spool 702, within the body portion and cylinder. A spring 704 normally biases the spool against the stop 706, thereby preventing any of the pressure in the system from passing to the signal line 548. When the piston 130 nears the end of its stroke, it unports port 710 to deliver pressure and force the spool against the action of spring 704. This allows a stroke signal to be delivered through line 548. Return of the piston to block port 710, also ports the supply line 712. The actuation pressure, delivered through line 140 then acts in conjunction with the spring 704 to return the spool to the signal blocking position.

The signal blocking position is illustrated for stroke sensor LS 3, wherein the pressure delivered through both lines 730 and 732 is equal, in that the piston 130 is not in the vicinity and therefore the spring pressure from spring 740 is sufficient to force the spool 742 against the stop 744, and block the passage of any pressure out of the stroke signal line 562.

Referring now to FIG. 7, the stroke sensors utilized in association with the meat injector piston are illustrated. Stroke sensor LS 2 is identical to sensors LS 1 and 3, however stroke sensor LS 4 is of a unique configuration to provide a stroke signal for the head end of the meat injector cylinder 34. The cylinder 34 incorporates an adjustable head end 36 secured through a screw threaded shank 39 to hand wheel 41. Rotation of the hand wheel causes the head end 36 to be translated along the cylinder and thereby alter the stroke and volume of the cylinder. To compensate for this variable head end, actuating pressure is delivered through the head end via line 43. LS 4 is a tap on the pressure line 43. Pressure is fed through a restrictor R 5 to No. 19 NOT. When the pressure in line 43 decays to zero, as a result of the piston 194 approaching the position illustrated, NOT will be reset to produce an output on line 604.

Figure 4:
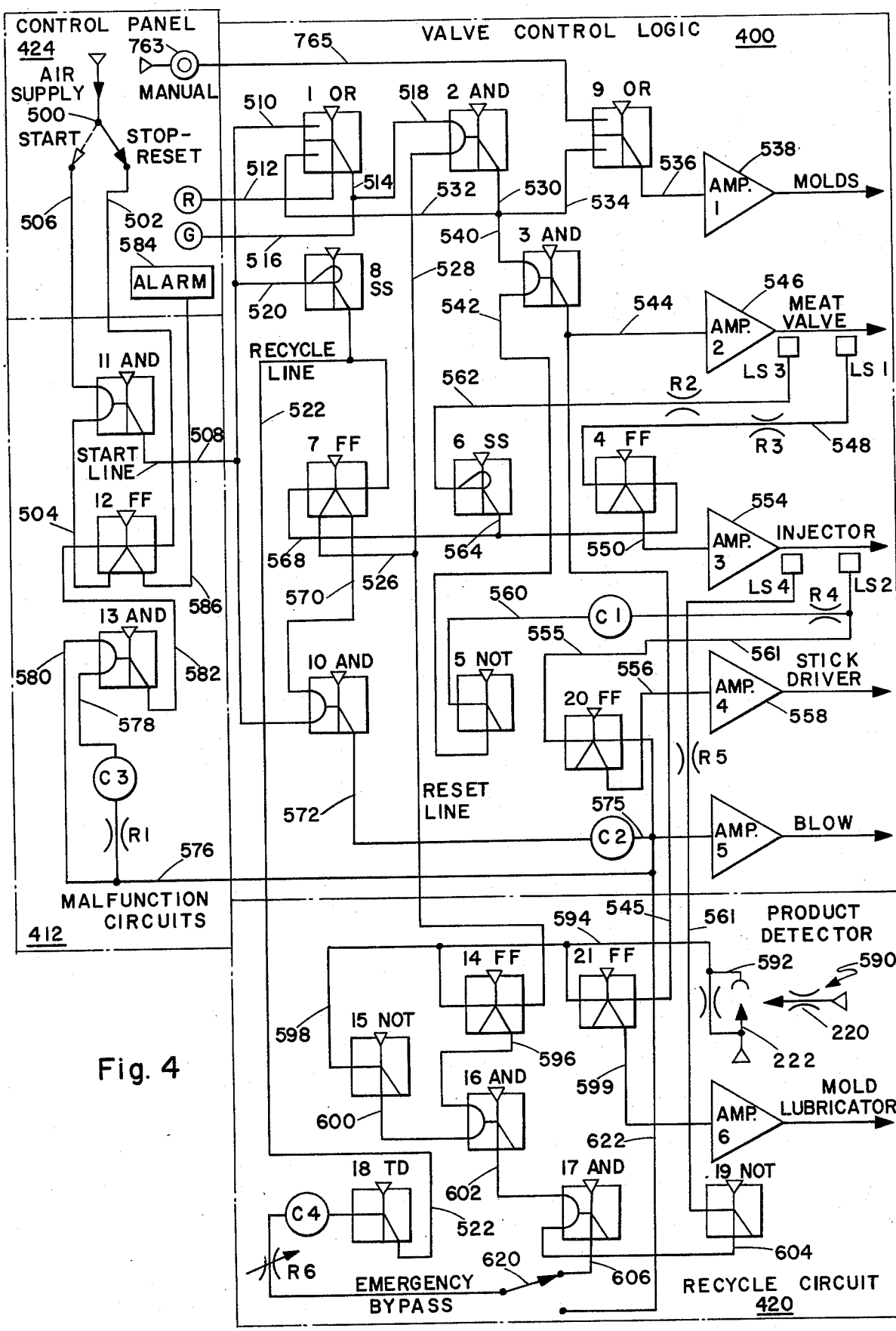
FIG. 4 is a schematic diagram of the process step control means.

Referring now to FIG. 4, the fluidic elements and schematic circuitry to accomplish the control functions of the process sequence control logic 400, malfunction circuit 412, and start stop logic 424, are illustrated. A start stop valve 500 is illustrated as supplying air to the stop reset line 502. The switch in this position sets No. 12 FF to have an output on line 504. When the start stop switch 500 is cycled to the start position, a signal is fed to line 506. This produces the requisite two signals on the control side of No. 11 AND, producing a signal on the start line 508.

The signal in the start line produces an "on" command to the No. 1 OR through line 510. No. 1 OR switches the output from line 512 (red signal) to a line 514 to produce a green signal on the control panel through line 516. When a signal first appears on the start line 508, such as when the machine is turned on, and this signal is delivered to No. 8 single shot (SS) through line 520, a pulse is delivered on the recycle line 522. The recycle line 522 is utilized to set No. 7 FF to have an output on line 526. The signal on line 526 is delivered to No. 2 AND by line 528 as well as reset No. 14 FF in the off position. This completes the two control signals on No. 2 AND thereby producing an output on line 530. The utilization of recycle line 522 in causing the machine to continually recycle itself, will be described more fully hereinafter.

The No. 2 AND output on line 530 causes a sustaining signal to be delivered on line 532 to No. 1 OR. This sustaining signal has the effect of maintaining the process in operation even if the start-stop valve has been turned to the stop position, until the machine reaches the completion of a cycle. In other words, so long as No. 2 AND is turned on, the machine will continue to operate and complete its cycle. The output of No. 2 AND is also utilized, via line 534, to produce an output from No. 9 OR, which output is delivered via line 536 to an amplifier 538 and to the air piloted valve 102 controlling the molds. This causes the molds to close in readiness to receive the meat charge. At the same time, the No. 2 AND output is being delivered to No. 3 AND through line 540. The signal on line 540 has the effect of turning No. 3 AND on since there is already present a signal on line 542, from No. 5 NOT. No. 5 NOT has an output at this time because it turns the signal on line 542 off only when the injector piston has completed the injection part of its cycle and a signal is on line 560. The output of No. 3 AND on line 544 is amplified by amplifier 546 and provides actuating pressure to the meat valve cylinder 38 by the action of air piloted valve 100. This has the effect of moving the meat valve to the inject position, which is the position illustrated in FIG. 3, with the opening 28 being in registration with the opening in the molds. When piston 130 of cylinder 38 completes its stroke, it produces a signal on stroke sensor LS 1 which is delivered through a restriction R 3 to No. 4 FF. The controlling signal on line 548 produces an output on line 550 on the No. 4 FF. The line 550 signals control the injector cylinder through amplifier 554. Thus the injector piston is commanded to begin the injection of the meat into the mold, as soon as the meat valve has cycled to the proper position.

At the completion of the injector stroke a signal is produced by stroke sensor LS 2 on line 555. Line 555 from LS 2 produces an output 556 on the No. 20 FF and line 556 signals control the stick driver cylinder through amplifier 558. The No. 4 amplifier controls the air piloted valve 104, and delivers actuating pressure to stick driver 52, causing a stick 48 to be forced into the filled mold cavity. Also at the completion of the injector stroke, the signal produced by the stroke sensor LS 2 is delivered through restriction R 4 and fluidic capacitor C 1, to sequence No. 5 NOT via line 560, thereby causing the output on line 542 to dissappear. The absence of a signal on line 542 terminates the output on line 544 from No. 3 AND, and therefore causes the retraction of the meat valve, by the sequencing of the air piloted valve 100 via Amp. 2 and line 132. The delay induced by the fluidic capacitor C 1 is for the purpose of allowing for a certain degree of compressibility of the meat being pressed into the mold cavity. This delay is on the order of one 50th of a second and allows the fill of the mold to stabilize before initiating the back stroke of the meat valve. The system then waits for the meat valve to reach its back position, which event is signaled on stroke sensor LS 3, through R 2 and through line 562 to the No. 6 SS produces a pulse on line 564, which pulse is utilized to reset No. 4 FF and cause commencement of the return stroke of the injector piston 194 by terminating the signal output on line 550. The No. 6 SS output pulse also resets No. 7 FF via line 568, signalling the end of the mold filling cycle and causing the mold to commence opening due to the termination of the output on No. 2 AND. Thus the system starts being made ready for another cycle, with the injector piston drawing in another charge of meat to the metering cavity, and the molds opening, to discharge the already formed product.

The resetting of No. 7 FF also turns on No. 10 AND through line 570, and thereby commences the delayed blow cycle, by producing an output on line 572, which is amplified by amplifier No. 5 after a sufficient delay, induced by fluidic capacitor C-2 574 (to allow the molds to start to open). The air blow is delivered on line 58, to induce or assist the product to drop out of the mold. The signal in line 575 to the Amp. 5 (Blow) and to No. 20 FF, switches signal output of No. 20 FF and turns off the signal on line 556 which in turn turns off Amp. 4. This causes the stick driver to retract to the position where it receives another stick into position for insertion into the molds on the next cycle. This operation occurs approximately when molds are in half open position. Cylinder 54 presses down on shoe 56 to ensure that the next stick is in proper position for driving.

The commencement of the blow cycle is signaled to the malfunction circuit on line 576. Unless the operation of the malfunction circuit is prevented, by the signal on line 576 being terminated by signal in recycle line 522, prior to No. 13 AND turning "on", the machine will shut down. The timing of No. 13 AND is determined by the fluidic capacitance C 3 in conjunction with the restrictor R 1. This R-C network has the effect of delaying a signal on line 578, considerably beyond the time at which a signal appears on line 580. This delay is on the order of 3 seconds, to allow an adequate time to allow the product to drop free and recycle signal to be produced. If no recycle signal has been produced within 3 seconds, No. 13 AND shuts down the machine by a signal on line 582 which resets No. 12 FF to turn off the signal on line 504, and turn on alarm 584, via line 586.

The recycle circuit will not call for a recycling of the system unless actual product dispensing is detected. The dispensing of the product is detected by the dispensed product detector means 590, that includes an emittor 220 producing an air stream 221 across the path of the dispensed product, and a receiver jet 222, which has a normally deflected airstream so that no signal pressure is delivered on line 592, to No. 14 FF. When a dispensed product interrupts the airstream, a signal is produced on line 592, which signal is delivered via line 594, to change FF 14 to have an output on line 596. The initial output of the product detector, also appears on line 598. Thus No. 16 AND is turned "on" when No. 14 FF is first set to an output at 596 by the product interrupting the airstream and a signal being produced on line 596 AND, then No. 15 NOT is switched off by the airstream being re-established, and an output being produced on line 600. The No. 16 AND output on line 602 is summed with the No. 19 NOT output on line 604. The No. 19 NOT will produce a signal only when the injector piston has returned to its loading position and the air pressure in line 561 has decayed essentially to zero. Thus LS 4 is actually a conduit from the supply line in the injector piston cylinder 34, and produces the appropriate output on line 604, when the pressure decays to a point indicating the return of the injector piston. This piston position indicates the system is ready for a new cycle to be initiated through line 606. The timing of the next cycle may be controlled by a variable restriction R 6, and fluidic capacitor C 4, determining how quickly No. 18 time delay (TD) is switched "on" to produce an output on recycle line 522. No. 18 TD may be set with a minimal time delay, such as 50th of a second, for high speed operation, or the machine operation may be slowed down for various production purposes by setting in a longer time delay. The recycle signal resets No. 7 FF. This has the effect of turning "off" the product blow signal and initiating a new cycle through No. 2 AND.

No. 18 TD has an additional function, in that it may be utilized on conjunction with the emergency bypass switch 620, to operate the machine without the use of a product detector. In this mode, the emergency bypass switch is switched to connect the No. 18 TD with the product blow line 622 whereby the initiation of the blow portion of the cycle utilized as an indication of cycle completion. An appropriate time delay is introduced through actuation of the variable resistor R 6 to allow normal product dispensing time.

It will be noted that recycling of the No. 7 FF has the effect of turning "off" the product blow, which also discontinues the signal on line 576 of the malfunction circuit. If the signal is received prior to the timing out of the R 1 – C 3 combination at No. 13 AND, there will be no malfunction signal on line 582, and the machine will recycle. Should a jam occur, and an output appear at 582 of 13 AND, the machine will be shut down by the recycling of No. 12 FF and the resultant lack of an output on No. 1 OR. The system may then be restarted only by cycling the start-stop switch from the start position to the stop position, and back to the start position.

Provision is made for manually causing the molds to close by fluidic switch 763 delivering a signal on line 765 to No. 9 OR, thereby allowing mold position adjustments to be made without actually operating the machine.

Figure 5:
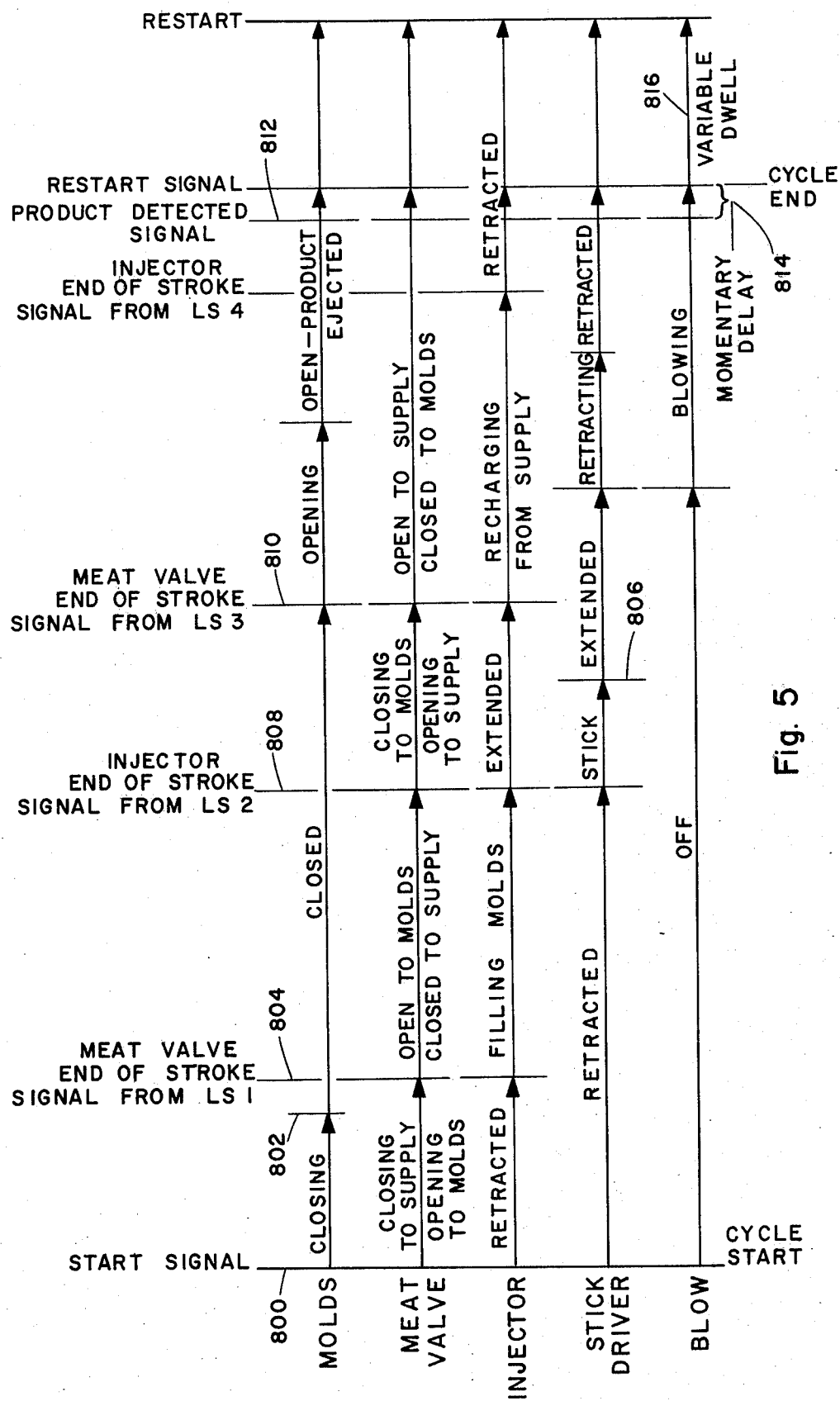
FIG. 5 is a diagram of the sequence and relation of the various machine operations.

Referring now to FIG. 5, the sequence and operation of the system is illustrated. A start signal 800 may be produced either by the initial movement of the start-stop valve to the start position or the recycle signal. Such a signal causes the closing of the molds, the opening of the meat valve to the mold-fill position, and the injector and stick drive to stay in the retracted position. The molds have a faster stroke and therefore complete their closing at 802 in advance of the opening of the meat valve to molds which is indicated by a signal on stroke sensor LS 1 at 804. The meat valve stroke signal sequences the logic to cause the injector piston to begin to move, and fill the mold. The completion of the mold filling is indicated from stroke sensor LS 2 on the injector at 808. The LS 2 signal causes the meat valve to begin to retract, cutting the molded product free for release. At the same time the stick driver starts to force stick into mold, which stroke is completed at 806 prior to the completion of the meat valve stroke at 810. The completion of the meat valve retraction is signaled at 810, by stroke sensor LS 3. This signal from the meat valve causes the molds to begin to open and the injector to refill the metering cavity. When molds are approximately one-half way open, the stick driver starts to retract and the air circuit to the mold blow turns on to assist in discharging the product from the molds. The stroke signal LS 4 on the injector indicates that the injector is ready for a new stroke. The system awaits both the injector piston being repositioned, and the detection of a product being dispensed at 812. When both these parameters have occurred, the system is ready for recycle, and has a built-in momentary delay 814, as well as increased variable delay 816, that is under the control of the variable restrictor R 6. If the system completes its cycle and a product is detected, prior to the timing out of the malfunction circuit, then a recycle is initiated.

Having described my invention, I now claim:

1. In a molding machine and control system for manufacturing molded food products wherein the molding machine forms a food product in a mold and dispenses the food product from the dispensing section of the molding machine and wherein the control system controls a plurality of sequential process steps in the molding machine process cycle, and wherein the molding machine contains a plurality of pneumatic actuators for powering the process steps in the process cycle, wherein the improvement comprises:

a plurality of sensor means connected to said pneumatic actuators for sensing the actuation position of said pneumatic actuators,
at least one of said pneumatic actuators comprising a piston and cylinder combination,
said process sensor means associated with said piston and cylinder combination comprises a cylinder stroke sensor means in pneumatic communication with said cylinder for producing a fluidic output under the influence of said piston substantially completing a stroke in said piston and cylinder combination,
process step control means connected to said plurality of sensor means for sequentially controlling succeeding process steps in response to signals from the individual one of said sensor means that is connected to the particular pneumatic actuator utilized in the proceeding step,
start-stop means connected to said process step control means for initiating a process cycle,
dispensed product detector means in association with the dispensing section of said molding machine for detecting the dispensing of the molded product at the completion of a process cycle,
recycle means connected to said dispensed product detector means for reactivating said process step control means in response to a signal from said dispensed product detector means,
malfunction means connected to said dispensed product detector means for stopping the process cycle and deactivating said recycle means when said dispensed product detector means does not detect the dispensing of a molded product.

2. A system as claimed in claim 1 wherein:
said pneumatic actuators comprise piston and cylinder combinations,
each of said process sensor means comprise a plurality of cylinder stroke sensor means for producing a fluidic output when a piston in said piston and cylinder combination substantially completes a stroke.

3. A system as claimed in claim 2 wherein:
said piston and cylinder combinations are powered through stroke pressure lines at opposite ends of said cylinders,
at least one of said process sensor means comprises a logic means for changing state when the pressure in one of said stroke pressure lines decays toward zero.

4. A system as claimed in claim 3 wherein:
at least one of said piston and cylinder combinations comprises an adjustable stroke piston and cylinder having a longitudinally adjustable cylinder end,
said logic means is connected to the stroke pressure line on said adjustable cylinder end.

5. A process-paced fluidic control system for a molding machine that dispenses a molded product from a dispensing section of the machine comprising:
a plurality of piston and cylinder combinations for actuating sequential process steps,
a plurality of piston stroke sensor means in pneumatic communication with said piston and cylinder combinations for producing a signal under the influence of the piston having substantially completed a stroke in said piston and cylinder combination,
process step control means connected to said piston stroke sensor means for controlling said piston and cylinder combinations, said process step control means comprising fluidic logic means for initiating a sequential process step after a signal from a selected one of said piston stroke sensor means, and cylinder control means connected to said process step control means for delivering pressure to said piston and cylinder combinations when commanded by said logic means.

* * * * *